Nov. 2, 1965  A. C. LIND ETAL  3,215,276
ADJUSTABLE BAFFLE GRIT CHAMBER
Filed Dec. 8, 1961  5 Sheets-Sheet 1

United States Patent Office 3,215,276
Patented Nov. 2, 1965

3,215,276
ADJUSTABLE BAFFLE GRIT CHAMBER
Arthur C. Lind, Wauwatosa, William J. Katz, Fox Point, and John L. Mancini, Menomonee Falls, Wis., assignors to Rex Chainbelt Inc., a corporation of Wisconsin
Filed Dec. 8, 1961, Ser. No. 158,034
2 Claims. (Cl. 210—197)

This invention relates to settling tanks for the removal of the grit from raw sewage as it is received by the sewage treatment plant and particularly to the type of tank wherein the grit is allowed to settle on a relatively flat floor and a current is maintained in the tank to transport the settled grit to a collecting trough along one wall of the tank. The current is provided by the circulatory motion which results from the release of air from submerged outlets located above the trough.

The removal of the sand and grit of up to 60 or 70 mesh is necessary to prevent damage to the pumps and equipment and to prevent clogging of the piping and conduits at low flows through the treatment plant. The removal of the finer grit of from over 60 or 70 mesh and anywhere up to 100 mesh is desirable for the same reasons but is less imperative. Such finer grit has a surface to volume ratio which is considerably higher than that of the 60–70 mesh grit and carries with it a large amount of putrescible organic matter. This organic matter is then included with the sand and grit which must be removed from the sewage and makes such sand and grit difficult to dispose of.

The removal of only the sand and grit from the sewage by settling is also complicated by the fact that the sewage is received by the treatment plant at widely varying rates and with greatly different concentrations. The rates vary from hour to hour and day to day and the amount of sand is particularly greater in the spring and after heavy rains.

According to the present invention the circulation of the sewage in the tank provides a graduated transport current over the floor of the tank and under the baffle to the trough and a graduated upward separation current between the baffle and wall of the tank over the trough.

The transport current velocity is at least the minimum required to move the heaviest material on the floor to the trough. As the settled sand and grit is moved over the floor the organic matter is mechanically removed therefrom and is then separately suspended and carried in the flow. The separation current velocity over the trough is the maximum which will not recirculate the settled clean grit but will recirculate the finer grit and all the suspended organic matter in the flow.

The velocities referred to may preferably diminish progressively from the inlet end of the tank to the outlet end. The heavier grit and sand settles soon after entering the tank and accordingly the transport velocity is greater nearer the inlet of the tank. With each recirculation of the flow, both the grit which settles out and the remaining suspended grit become progressively finer and lighter and are carried by progressively lower transport and separation velocities. At the outlet end of the tank the separation current is at the lowest possible velocity so that a minimum of settleable grit remains in suspension and is carried out of the tank with the flow.

The drawings furnished herewith illustrate the best mode of carrying out the invention as presently contemplated and set forth hereinafter. In the drawings:

FIGURE 1 is a vertical cross-section of the tank at approximately its center. The outline of the sump at the end of the trough is shown in broken lines. The baffle is shown in its position nearest the tank wall and is movable to the position away from the wall as shown in broken lines. The latter position allows swinging of the air supply means through the position shown in broken lines to the top of the tank for servicing and maintenance. The motor reduction unit connected to the shaft extending outside of the tauk drives the collecting means;

Figure 1:
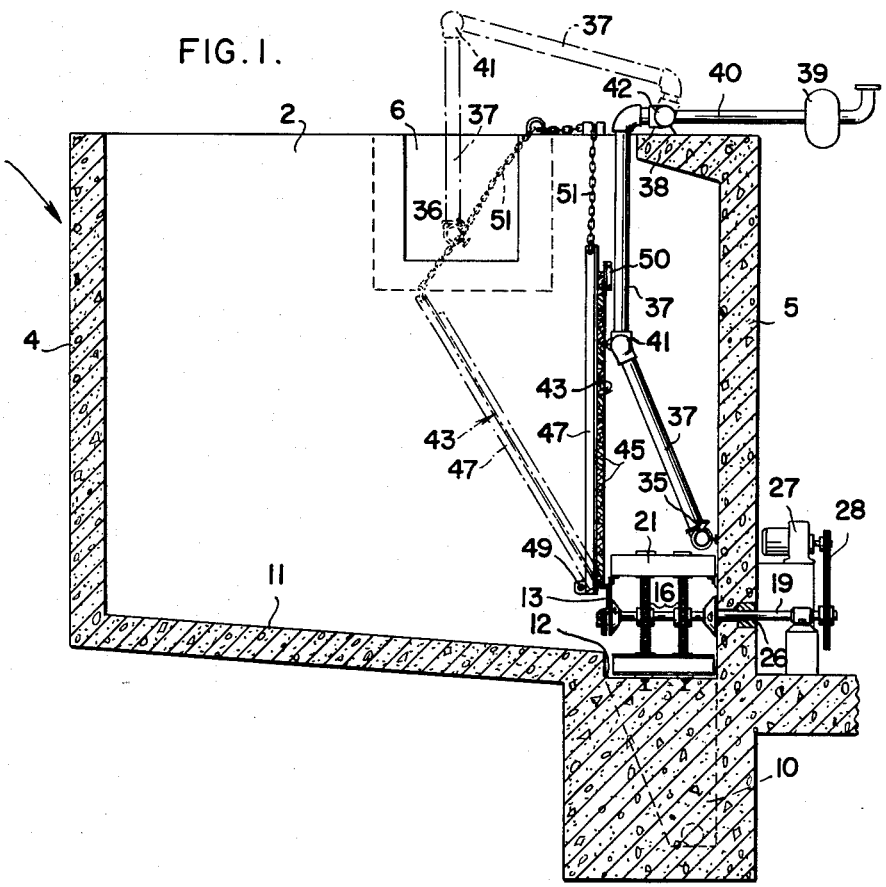
Figure 2:
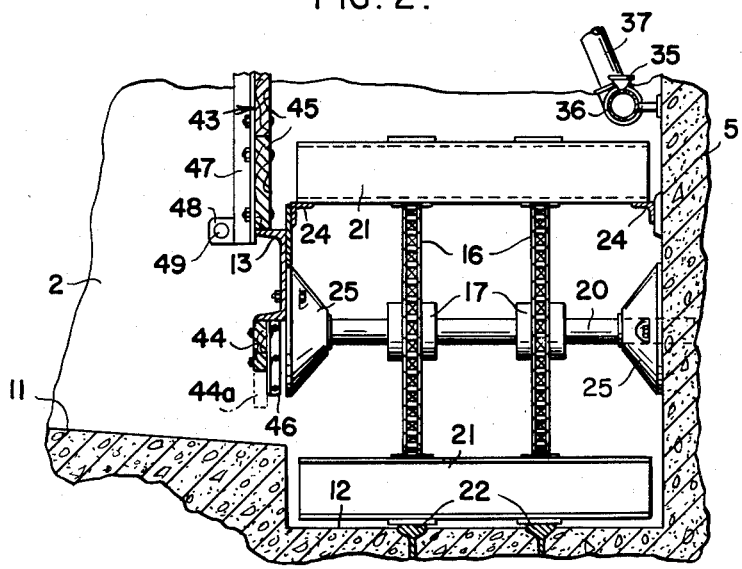
FIG. 2 is an enlarged section showing in end elevation the chain and scraper conveyor which is driven by the motor-reduction unit shown in FIGURE 1.
Figure 3:
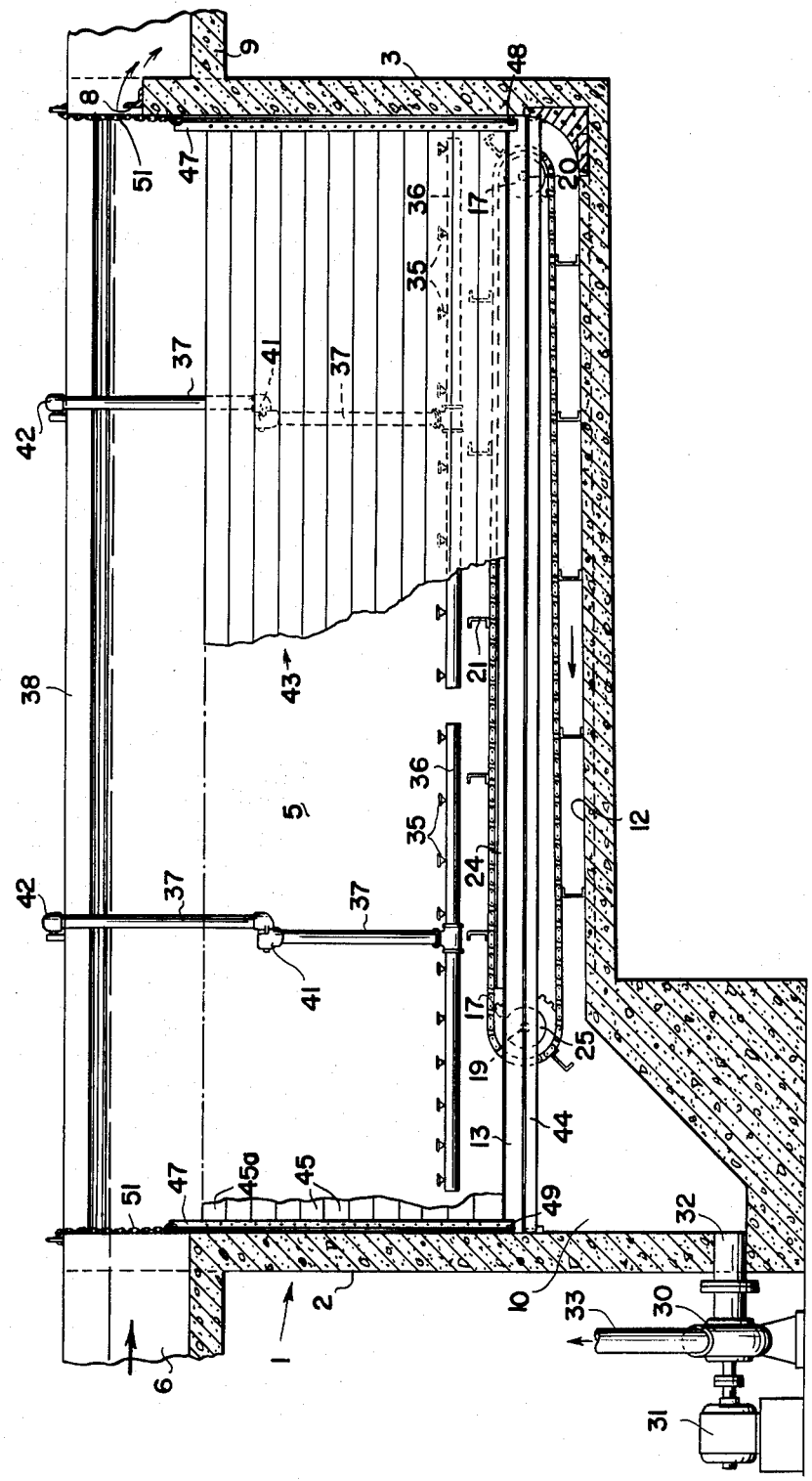
FIG. 3 is a vertical longitudinal cross-section of the tank. The section includes the sump at the end of the trough and the baffle is broken away and sectioned to show the air supply means and outlets in elevation.
Figure 4:
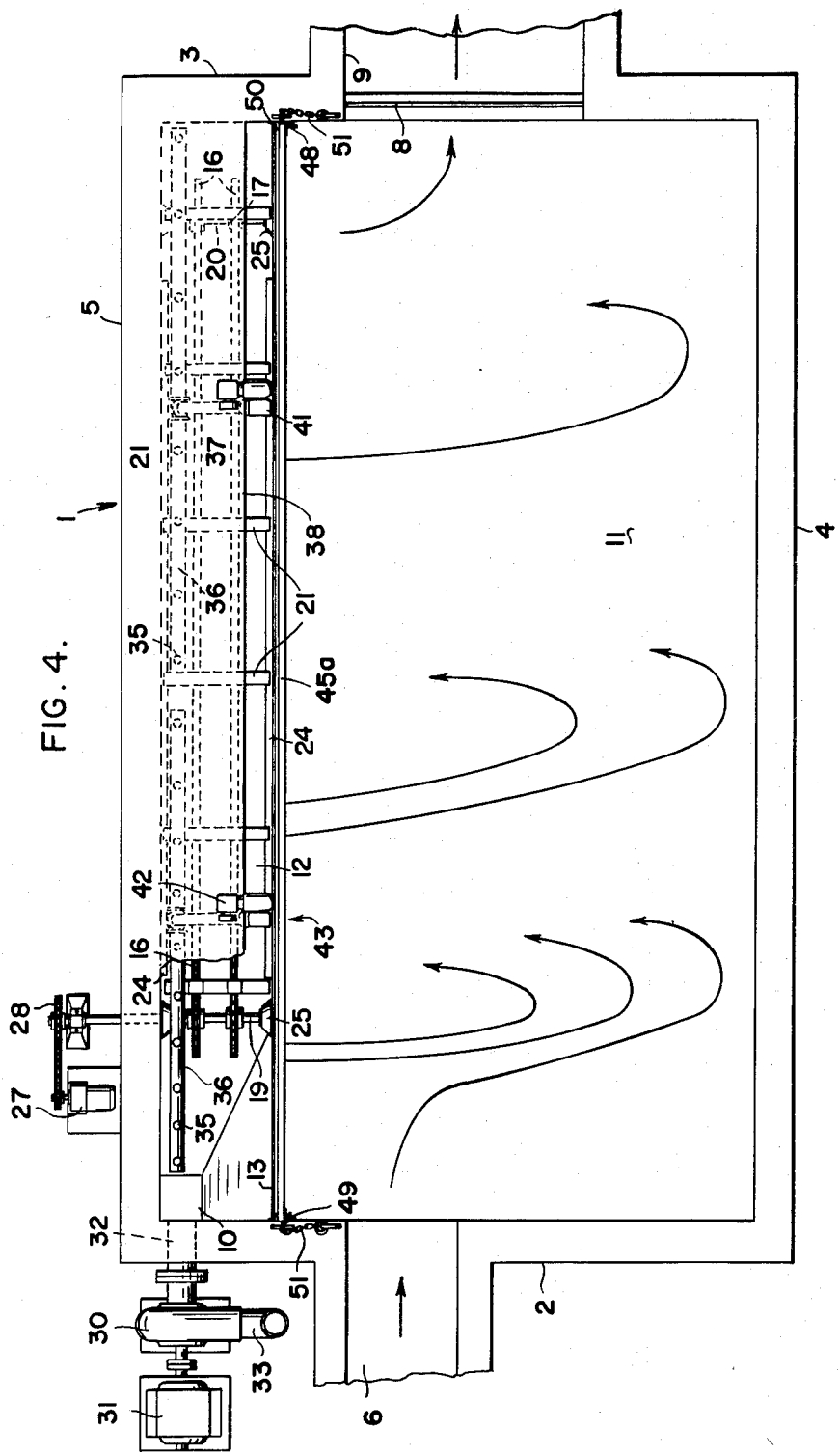
FIG. 4 is a plan view of the tank with a part of the tank over the sump broken away and sectioned to show the sump at the end of the trough in plan. The arrows are to illustrate the general flow through the tank at a progressively lower circulating velocity.
Figure 5:
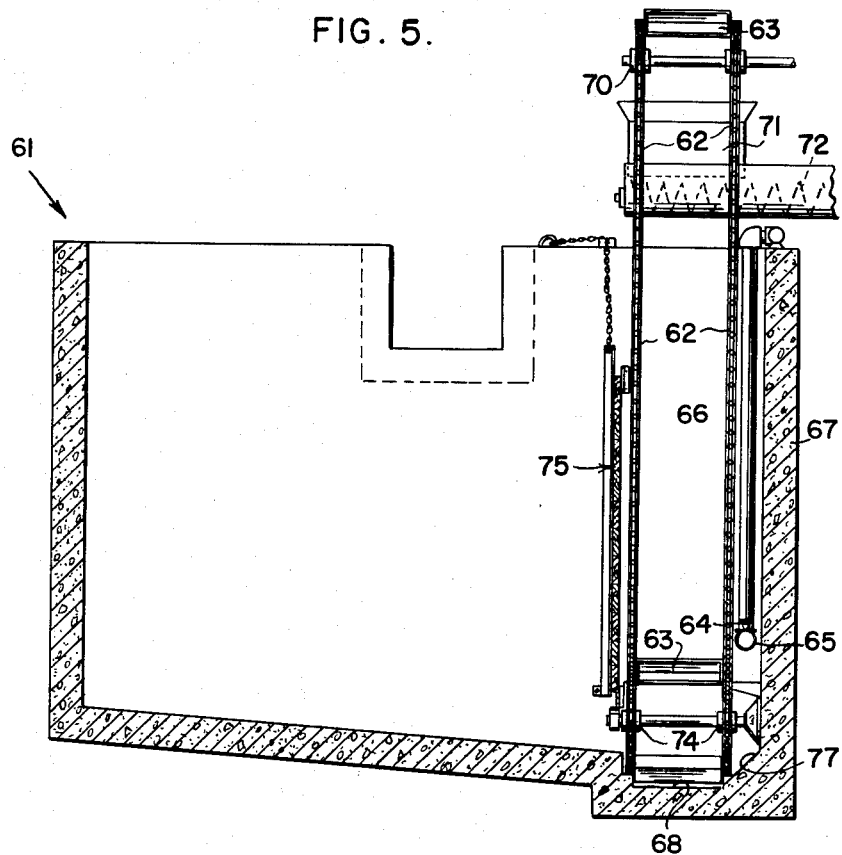
FIG. 5 is a section through a tank showing an alternate embodiment of the invention wherein the grit collecting means comprises a series of buckets which push the grit to one end of the trough and then lift the grit over the upper drive sprocket to dump the grit into a hopper immediately therebeneath.
Figure 6:
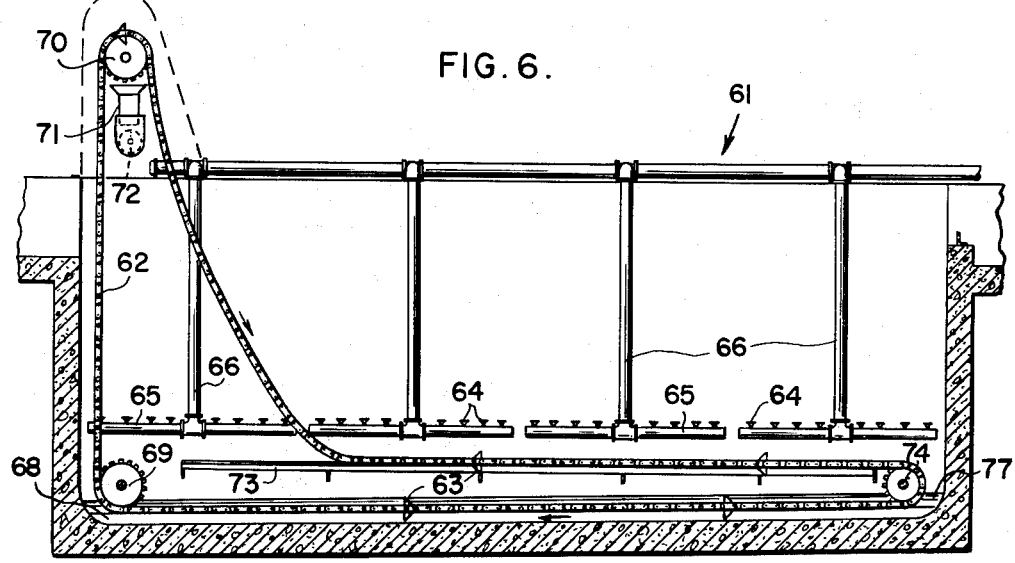
Figure 7:
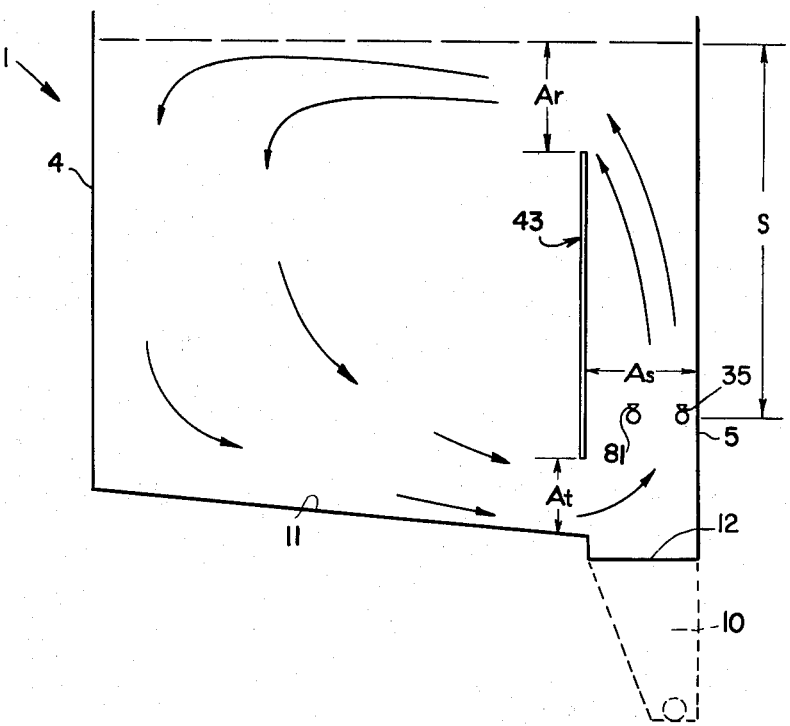

FIG. 6 is longitudinal section of the tank shown in FIG. 5 and includes the housing normally provided the upper chain and drive means. The baffle is removed to show the air outlet means between the wall and the chain and bucket collecting means; and FIG. 7 is a line drawing of a section of the tank shown in FIGS. 1–4 with arrows to indicate generally the circulation of the sewage in the tank as will be described.

The tank 1 shown in the drawings includes the end walls 2 and 3 and side walls 4 and 5. The sewage enters tank 1 from the delivery channel 6 through the opening shown at the top of wall 2 and the sewage, after the settleable grit is removed, is discharged over the weir 8 in wall 3 and into the channel 9. Weir 8 serves to maintain a given liquid level within the tank and is located opposite the opening in wall 2 referred to. Opening 7 is preferably located near the sump 10 at one corner of the tank and may be submerged if desired.

The floor 11 of tank 1 slopes slightly downwardly from wall 4 to the shallow trough 12 which extends alongside wall 5 to sump 10.

The ends of the channel beam 13 are set in end walls 2 and 3 and the beam extends the length of the tank a short distance above the part of the floor 11 which is alongside or immediate to trough 12 or the edge of the trough.

The parallel chains 16 operating over the paired sprockets 17 on shafts 19 and 20 carry the series of scrapers 21. The lower run of scrapers 21 move on the rails 22 set in the bottom of trough 12 to move the grit thereover toward sump 10. The scrapers 21 of the upper return run move on the pair of rails 24 respectively fixed to and supported by wall 5 and beam 13 above the latter.

Shafts 19 and 20 are supported in the bearings 25 bolted to beam 13 and wall 5 as may be required to extend below the lower edge of beam 13 as shown. Shaft 19 which is located at sump 12 extends through wall 5 and the seal 26 set in wall 5 and is driven by the motor-reduction unit 27 through the chain drive 28 connected thereto. The grit collected in sump 10 may be variously removed as by a chain and bucket elevator as will be described, or by the pump 30 shown in FIGS. 3 and 4 and which is driven by the motor 31 and is connected to the withdrawal pipe 32 from the sump and to the discharge pipe 33.

The outlets 35 through which the air is introduced into the tank 1 are connected to the horizontal headers 36 extending along and close to wall 5 immediately above the return run of scrapers 21. Headers 36 are supported in the tank by the pipes 37 which extend downwardly from the overhanging ledge 38 of tank 1 and provide delivery of the air to headers 36 from the pump 39 shown diagrammatically in FIGURE 1 and connected to pipes 37 by pipe 40. The joint 41 between corresponding pipes 37 and the fixture 42 on ledge 38 allows the pipes to be swung upwardly through the position shown in broken lines in FIGURE 1 so that headers 36 are over the ledge and directly accessible for maintenance and servicing.

The baffle 43 provided according to the invention may be located alongside beam 13 or may include beam 13 and the boards 44 and 45 above and below the beam. One board 44 is shown below beam 13 and is bolted at its ends to the angle-irons 46 fixed to walls 2 and 3, beneath the beam. A second board 44a, shown in broken lines may also be attached to angle-irons 46 as required. Generally, the size of the opening between the bottom of board 44 and 44a and floor 11 or edge of the trough is readily predetermined as will be described and will generally be between six and twenty-four inches.

The boards 45 above beam 13 are bolted at their ends to the angle-irons 47 which hold them together. Bracing and supports between their ends are not shown in the drawings but will be readily provided. The uppermost board 45a may be removed or additional boards, not shown, may be added to adjust the top of the baffle with respect to the water surface.

The brackets 48 fixed to the lower ends of angle-irons 47 are mounted on pins 49 projecting from walls 2 and 3 to allow the upper boards 45 to swing as a unit on the pins. The boards 45 are held in the vertical position against the abutment 50 by the adjustable chain means 51 or whatever means may be provided. Such means should allow the boards to swing on pins 49 away from wall 5 to allow lifting headers 36 out of the tank as described.

In the operation of the tank the air-lift or "pumping" action of the bubbles rising from outlets 35 provides the upward separation current between the baffle and wall 5 and the recirculation current across the tank near the water surface and toward wall 4. The upward current is drawn from over floor 11 and beneath baffle 43 to outlets 35 at wall 5 to provide the transport current described.

The sand and heavy grit entering the tank settles more or less directly on the floor nearer the inlet end of the tank and sump 10. The incoming sewage and remaining grit merges with the sewage in the tank and is recirculated a number of times before reaching the outlet end of the tank depending upon the length thereof. During each pass over floor 11 the heavier grit settles out and as it is pushed over the floor by the transport current, the putrescible organic material adhering thereto is mechanically removed as the grit is rolled over the floor. The transport current passes under baffle 43 and over the trough 12 to the outlets 35 at wall 5 at the required velocity.

According to the invention, the velocity of the currents at each location in the tank is determined and provided as required by the relationship of the baffle respecting floor 11 and wall 5 and the amount of air released from outlets 35 along wall 5.

The required or minimum transport velocity beneath the baffle will generally be about two feet per second and the mean velocity in the separation zone between the wall and baffle should generally be at least one-half foot per second. As such, the location of the baffle respecting the floor and the wall of the tank may be determined from the relationship:

$$Vt/Vs = As/At$$

Where:

$Vt$ is the mean transport velocity beneath the baffle (f.p.s.);

$Vs$ is the mean upward, separation velocity between the baffle and the wall (f.p.s.);

$As$ is the area of the cross-section of the separation zone (sq. ft.);

$At$ is the area of the cross-section of the opening between the baffle and the floor (sq. ft.);

As described, the rate of circulation (Q) of the flow under the baffle should be several times the rate of flow through the tank from which the required area $As$ and $At$ may be determined by the relationship:

$$Q = AtVt = AsVs$$

The air required to effect the rate of circulation Q is dependent upon several factors and has been found by experiment to follow generally the relationship:

$$Af = KAs\,(Vt/S)^n$$

Where:

$Af$ is the amount of air required (s.c.f.m.);
$S$ is the submergence of the air outlets (ft.);
$K$ is a factor which takes into account viscosity of the fluid (water) and gravity and the effectiveness of the particular air outlets used to introduce the air at submergence S; and $n$ is a constant exponent which will generally be very near the value of 2.

The foregoing shows the importance of the depth of submergence of the air outlets upon the "pumping action" (Q) effected by the air between the baffle and tank wall and the above calculations may also be used with different values corresponding to successive sections of the tank to provide progressively diminishing velocities as described hereinafter.

In practice, the distance between baffle 43 and side wall 5 should be between one and one-half (1½) and four (4) times the distance between the baffle and floor 11 so that the bottom of the baffle is above the floor at the edge of the trough.

The outlets 35 are located at wall 5 and as low as possible to provide an upward separation current which expands in area as determined by the spacing between baffle 43 and wall 5 and diminishes to an upward velocity at the top of baffle 43 which is only sufficient to carry over the heaviest grit to be recirculated.

Where desired, and particularly where an especially efficient separation of the grit is required, the velocity of the upward separation current and the velocity of the transport current across floor 11 is set to diminish progressively from the inlet end of the tank toward the outlet end by having the rate of release of air from headers 36 progressively diminish in the downstream direction of the tank. This can be accomplished by the use of outlets 35 of progressively smaller size or, as a more practical alternative, the spacing of the outlets 35 can be progressively increased as is shown in the drawings.

As the heavier grit in the flow settles out, the remaining grit to be removed becomes progressively finer and has a lower settling rate. The finer grit allows a progressively lower velocity of the flow for transport to the trough and requires a progressively lower velocity to allow the cleaned finer grit to settle out or remain settled out.

Accordingly, the invention provides throughout the tank the optimum settling and minimum transport conditions required as the heavier grit is progressively removed and the remaining settleable grit is cleaned so that maximum removal is accomplished at whatever rate the sewage is received.

The tank 61 shown in FIGS. 5 and 6 is similar to tank 1 except that tank 61 is provided with a grit collection mechanism which includes parallel chains 62 carrying the buckets 63.

The circulation of the sewage is provided by the discharge of air from the outlets 64 of the horizontal pipes 65 extending from the lower ends of the supply pipes 66 located next to wall 67 of tank 61.

The buckets 63 push the grit in the trough 68 to the slightly lower end of the trough and carry the grit upwardly from sprockets 69 to the drive sprockets 70 located above the tank and over the hopper 71. The buckets moving over sprockets 70 discharge into hopper 71 which opens into the screw conveyor 72 providing removal of the grit from the tank.

The return run of chains 62 extends down to the carrying rails 73 and to sprockets 74 at the slightly higher end of trough 68.

The supply pipes 66 and pipes 65 with the air outlets 64 are located between wall 67 of tank 61 and the chain and bucket removal mechanism. As in tank 1, the conveyor mechanism is thus disposed between the air outlets 64 and the opening beneath the baffle 75 so that the flow from beneath baffle 75 extends all the way over trough 68 to wall 67 and the grit is carried fully into the trough. The floor 77 between wall 67 and trough 68 is steeply inclined so that any grit settling between trough 68 and wall 67 will be carried by gravity (against the flow) into the trough.

The tank 1 shown in FIGURES 1–4 and described above, is shown diagrammatically in section in FIG. 7 and includes the additional air outlet devices 81 which extend in a series which is parallel to the air outlets 35. The additional air outlets 81 may improve the effectiveness of the air outlets used and will affect the factor K appearing in the formulas given above.

According to the invention, it is also important that the distance from the top of the baffle to the water surface and the corresponding area A$r$ be limited. The area A$r$ generally should not be less than about twice the area A$t$. If the top of the baffle is too low, the water is drawn toward the top of the baffle from the center of the tank and reduces the flow which passes under the baffle. Generally, area A$r$ should be about one and one-half times the area A$t$ between the bottom of the baffle and the floor of the tank. This will provide the maximum practical velocity at the water surface which is required to have the circulation reach the side wall 4 of the tank and only a minor fraction of the flow over the floor of the tank will pass upwardly along the side of the baffle facing wall 4.

Various embodiments of the invention may be employed within the scope of the accompanying claims.

We claim:
1. Apparatus for treating a sewage flow containing grit and organic material comprising a tank with inlet means for introducing the flow therein, outlet means in the tank including weir means for discharging the sewage less the removable grit and for maintaining a predetermined liquid level in said tank, a baffle along one side wall of the tank and spaced therefrom, the upper edge of said baffle being below the liquid level and the lower edge of said baffle being spaced from the floor of said tank a distance between one-fourth and two-thirds of the distance between said baffle and side wall of the tank, a trough in the floor of said tank between said baffle and side wall, sump means communicating with said trough at the inlet end of the tank, conveyor means in said tank for conveying settled grit in said trough to said sump, spaced air release means located adjacent to said side wall and at approximately the elevation of the lower edge of said baffle, said air release means establishing a general circulation of the sewage in said tank across the floor toward said side wall, over said trough and upwardly through the space between said baffle and side wall and then back into said tank, said air release means and said baffle being so constructed and arranged so as to effect a transport current across the floor of said tank at a velocity sufficient to carry settled grit and organic matter into said trough and an upward current through the space between said baffle and side wall at a velocity sufficient to recirculate organic matter in said trough upwardly through the space between said baffle and side wall and over the upper edge of said baffle back into said tank, said air release means being further constructed and arranged such that at the outlet end of the tank the transport current and velocity are present for carrying grit and organic matter into said trough and the upward current and velocity are such that settled grit remains in said trough while all suspended organic matter and finer grit having a settling velocity in the range of that of the suspended organic matter are recirculated.

2. The apparatus of claim 1 wherein the conveyor means comprises a chain operated series of conveying means having a lower run in the trough in the direction of said sump and an upper return run in the space between the baffle and said side wall of the tank and above the lower edge of the baffle and below said air release means.

References Cited by the Examiner

UNITED STATES PATENTS

| | | | |
|---|---|---|---|
| 1,937,434 | 11/33 | Piatt | 210—14 |
| 2,126,228 | 8/38 | Streander | 210—220 |
| 2,309,002 | 1/43 | Nichols | 210—526 X |
| 2,532,457 | 12/50 | Morgan et al. | 210—526 X |
| 2,708,520 | 5/55 | Dallas | 210—525 |
| 2,989,186 | 6/61 | Weis | 210—221 X |
| 3,015,396 | 1/62 | Quast | 210—221 |

REUBEN FRIEDMAN, *Primary Examiner.*

GEORGE D. MITCHELL, HERBERT L. MARTIN, *Examiners.*